March 4, 1969     G. MATHES     3,430,903

METHOD AND DEVICE FOR CLAMPING

Filed Dec. 6, 1965

INVENTOR
GUNTHER MATHES

BY
Curtis, Morris & Safford
ATTORNEYS

United States Patent Office 3,430,903
Patented Mar. 4, 1969

3,430,903
METHOD AND DEVICE FOR CLAMPING
Gunther Mathes, Vaduz, Liechtenstein, assignor to Anstalt fur Montage-Technik, Vaduz, Principality of Liechtenstein
Filed Dec. 6, 1965, Ser. No. 511,926
Claims priority, application Germany, Dec. 7, 1964, A 47,802
U.S. Cl. 248—68    5 Claims
Int. Cl. F16l 3/04, 3/10, 3/22

ABSTRACT OF THE DISCLOSURE

A device for clamping cables and similar objects to a supporting surface is comprised of a stud arranged to be anchored into the supporting surface and a clamp element arranged to be secured onto the stud and to hold one or a number of objects on the supporting surface. The end of the stud which extends outwardly from the supporting surface is provided with serrations. The clamping element which may be composed of a single or of multiple parts, is formed of a yieldable thermo-plastic material and has a hub with an opening through it. The opening has a diameter smaller than the diameter of the stud and, is arranged to be forced onto the stud, whereby initially the material of the clamping element yields as it passes onto the stud and then contracts into locking engagement with the serrations on the stud. The clamping element has a concave surface for supporting the object against either the wall or another concave surface provided by a cooperating part of the clamping element.

---

The present invention relates to a method of fastening single-part or multi-part cable clamps in operative position and to clamp constructions used to carry out the method.

It has heretofore been known to fasten cables and pipes to a wall by means of a single-piece strap positioned over cable or pipe and attached to the wall by means of a nail or screw. With such a construction, the cable or pipe, the strap and the screw together with the tool, must all be held by hand while being attached by the nail or screw. This cumbersome manipulation requires a considerable expeniture of time and leads to poor mountings, as well as to poorly tensioned cables.

It has also been known to fasten cables by means of stand-off clamps having a lower part attached to the support or wall screws or nails and an upper part connected to the lower part by additional fastening means, such as screws or notches after the cable has been inserted therebetween. This manner of laying cables also is cumbersome and requires a considerable amount of time. It should be borne in mind that the laying of cables by means of stand-off clamps is many times done in cellars where the walls are usually of concrete so that the attachment of the bottom part of the cable clamp by means of screws can be accomplished only with the use of plugs.

The object of the present invention is to provide a method of and clamp construction for laying cables which avoid the above disadvantages and adapts the cable to be laid and the clamp parts to be attached to the wall in a simple, dependable and rapid manner.

In accordance with the present invention, these objects are achieved by providing an anchoring stud having a serrated surface, driving the stud into the wall adjacent the location where the cable is to be laid, placing the cable at the location where it is to be clamped, either against the wall or on a base element of the clamp, providing a clamping element for the cable of a material which will yield and then tend to return to its original shape and driving the clamping element onto the serrated anchoring stud to cause it to yield as it moves into clamping position and then flow into the recesses between serrations to lock the element in clamping position on the stud.

The advantage of this method is obvious as it provides for clamping a cable in position by driving a clamping element onto the stud by a single hammer blow. Such anchoring studs may be inserted into walls of wood, brick or concrete by present day types of stud drivers, whether they be manual drivers or drivers operated by explosive powder. Also, plastic materials are now available having the required characteristics of yielding when struck and then returning to the original shape. Such a characteristic of yielding and returning to the original shape is sometimes called the "memory" of the material. Thus, any suitable plastic material may be used which will yield to pass over the serrations on the stud and then flow back into the grooves between serrations to lock the clamping element on the stud.

In one device for the carrying out of the method, the hole in the plastic arm of the cable clamp preferably has a smaller diameter than the head of the anchoring stud and the protruding end of the stud is provided with threads or knurling. Another device for carrying out the method comprises a multi-part stand-off cable clamp, the upper part of which has a hole for coaxial alignment with a recess in the lower part and is adapted to receive the anchoring stud.

The invention will now be described in further detail with reference to the accompanying illustrative drawings, in which.

Figure 1:
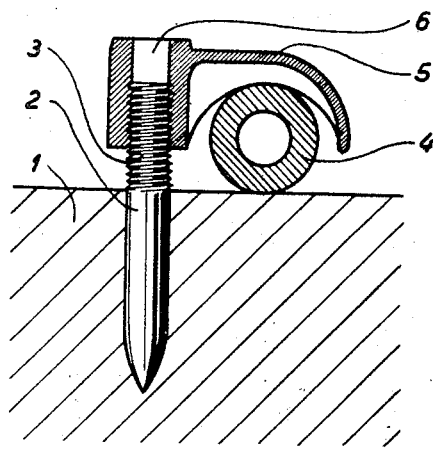
FIGURE 1 is a transverse sectional view through a single-part cable clamp which engages and holds a cable in place against a wall.

As will be observed by reference to FIGURE 1, a cable or pipe 4 when clamped in accordance with the method of the present invention comprises an anchoring stud 2 driven into the fastening material, such as a wall, and having a threaded end 3 protruding from the wall. Instead of the thread 3 a knurling could be provided on the protruding end of the stud 2. The cable 4 to be laid is clamped to wall 1 by a strap 5 of plastic material which is locked on the stud 2 and overlies the cable 4. The strap 5 has a hole 6 with a diameter somewhat smaller than the outside diameter of the shank of the serrated end of the stud 2 projecting from the wall or other surface 1 and the plastic material of the strap is locked to the threads on the stud.

In accordance with the method of the present invention, the fastening points for the cable straps 5 are marked on the wall or other surface in a customary manner and an anchoring stud 2 is driven into the wall adjacent each marked point by a suitable hammer. Cable 4 is then stretched along the wall where it is to be laid and clamped and a strap 5 is driven onto each anchoring stud 2 to clamp the cable to the wall. To this end, the hole 6 in the strap 5 is aligned with the projecting serrated end of the stud 2 and then impacted with a hammer to drive the strap into engagement with the cable 4. If the strap 5 is provided with oppositely directed arms, two cables or pipes may be fastened simultaneously in this manner.

The fastening of the straps 5 on the anchoring studs 2 is accomplished by the force produced by striking the tubular portion of the strap to move it with respect to the stud 2. As the hole of the strap 5 is smaller than the diameter of the threaded end of the stud, work is done on the plastic material of the strap to cause it to expand as it moves over the threads and produces a stress in the material. This stress produces a flow of the plastic material around and into the grooves between the threads so that the strap becomes anchored to the stud 2 in a manner similar to a normal screw connection. A suitable plastic material must be selected which withstands such expansion without breaking and which, furthermore, does not corrode or produce any inherent stresses which even under continuous load might cause cracking and subsequent failure of the strap. Thermoplastic materials in the general class of polyamides or polyolefins are suitable for this purpose.

Figure 2:
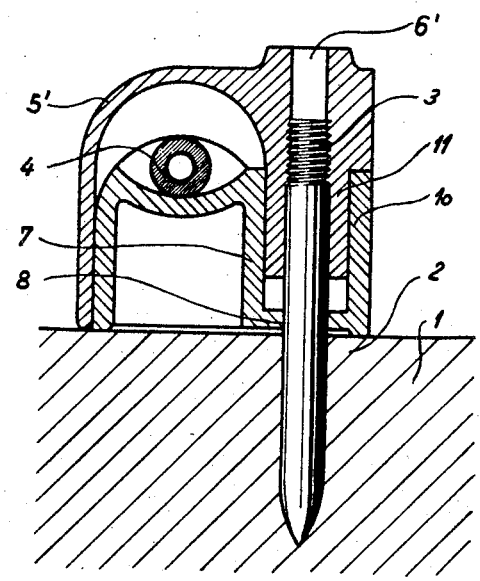
FIGURE 2 is a transverse sectional view of a multi-part cable clamp consisting of a lower part and an upper part for clamping a cable therebetween.

FIGURE 2 shows a stand-off type of clamp for fastening a cable in accordance with the present invention. This construction also uses an anchoring stud 2 provided with a thread 3 at its projecting end and which is driven into the material 1 of a wall at the marked points. The lower part 7 of the clamp has a hole 8 to adapt it to be slid into place over the anchoring stud 2. After the cable 4 has been placed in a groove in the lower part 7 of the clamp, the upper part 5' of the clamp is hammered onto the serrated projecting end of the anchoring stud 2 to clamp the cable 4 in place on the wall 1. The upper part 5' of the clamp is provided with a hole 6' which has a smaller diameter than the anchoring stud 1, the same as in the embodiment shown in FIGURE 1, and this hole is aligned co-axially with a recess in the lower part 7 of the cable clamp. For precise alignment of the lower part 7 and the upper part 5', the lower part can be provided with a rectangular recess 10 and the upper part with a rectangular shaft 11 by which automatic alignment is effected.

Figure 3:
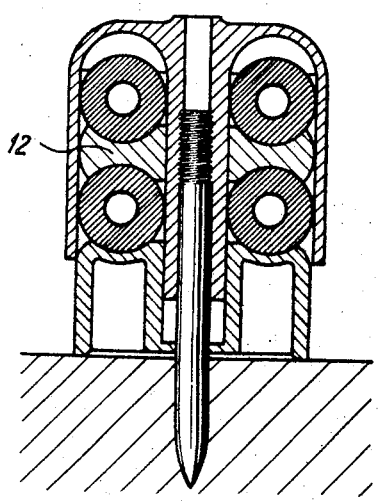
FIGURE 3 illustrates a clamp for mounting a plurality of cables by means of intermediate members.

It will be observed by reference to FIGURE 3 that a plurality of cables can be fastened in accordance with the method of the invention by the interposing of intermediate pieces 12 between aligned lower and upper parts of a clamping device similar to that shown in FIGURE 2. The parts of the clamp are locked to each other in clamping relationship by driving an upper plastic part onto a serrated stud while in alignment with a lower clamping part, the same as in FIGURE 2.

While several forms of clamping devices are shown and described herein, it will be understood that further changes can be made in the steps of the method and form of the appartus without departing from the spirit or scope of the invention. Therefore, without limitation in this respect, the invention is defined by the following claims.

I claim:
1. A device for clamping an object such as a cable, a pipe and the like to a supporting surface comprises an axially elongated stud having a first end and a second end, the first end of said stud being arranged to be driven into and anchored within the supporting surface, said stud having serrations adjacent its second end and the second end arranged to be disposed outwardly from the supporting surface when the stud is anchored therein, a clamping element formed of a cold flowable thermoplastic material, a hub portion in said clamping element having an opening extending therethrough having a diameter less than the diameter of said stud, the opening in said hub arranged to be aligned with and to be driven onto the second end of said stud, a support strap of said clamping element being integrally attached to and extending outwardly from said hub, said support strap having a concave surface arranged to contact and form a support cradle for the object to be clamped to the supporting surface, and the concave surface arranged to face toward the supporting surface when said clamping element is in position on said stud, whereby the clamping element secures a said object to the supporting surface and the cold flowable thermoplastic material forming the clamping element deforms as it is driven onto the stud and contracts onto the serrations on said stud in interlocking relationship therewith.

2. A device as set forth in claim 1, wherein said support element comprises a first part including said hub and said strap and a separate second part, said second part having an opening therethrough whereby said second part is arranged to be slidably positioned on said stud and in contacting relationship with the supporting surface, said second part having a concave surface thereon arranged to support the object clamped to the supporting surface and disposed in oppositely facing relationship with the concave surface on said first part.

3. A device as set forth in claim 2, wherein said second part has walls forming a rectangular shaped socket disposed concentrically about the opening therethrough, said hub of said first part having a portion thereof of rectangular cross section disposed concentrically about the opening therethrough and arranged to be received in closely fitting engagement within the socket in said second part whereby the openings in said hub and in said second part are disposed in axial alignment.

4. A device as set forth in claim 3, wherein said clamping element comprises a spacer member arranged to be positioned between adjacent objects disposed within said first and second parts of said clamping element, said spacer member having oppositely facing concavely shaped surfaces for supporting the objects.

5. A device as set forth in claim 2, wherein said second part has concave support surfaces arranged to be disposed on opposite sides of said stud, said first part having a pair of oppositely disposed support straps arranged to be positioned on the opposite sides of said stud and to cooperate with said supprt surfaces in said second part for clamping a multiple number of objects to the supporting surface.

References Cited
UNITED STATES PATENTS

| 228,816 | 6/1880 | Huff. |
| 1,979,091 | 10/1934 | Alsaker et al. _____ 29—526 X |
| 2,675,607 | 4/1954 | Catlin _____ 29—526 |
| 2,826,222 | 3/1958 | Case. |

FOREIGN PATENTS

| 342,688 | 1920 | Germany. |
| 1,280,041 | 1961 | France. |

WILLIAM I. BROOKS, *Primary Examiner.*

U.S. Cl. X.R.

29—450, 526; 248—71; 151—7; 85—36